Figure 2:
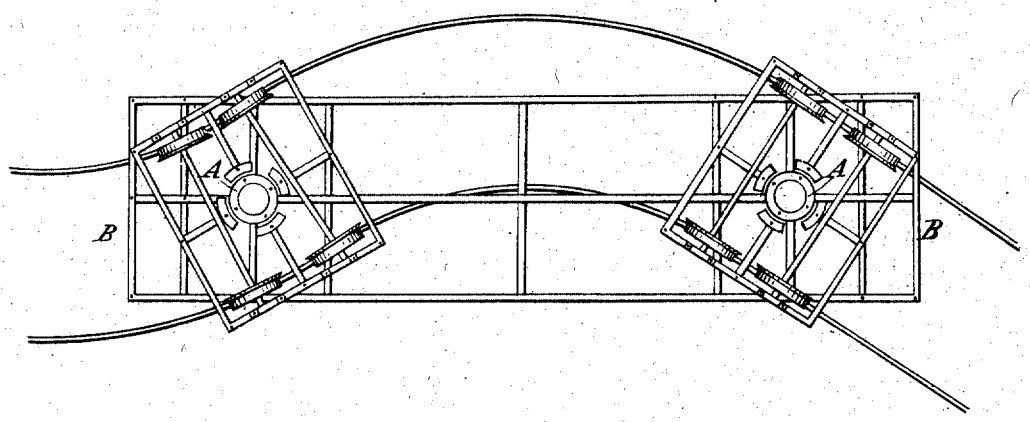
Figure 1:
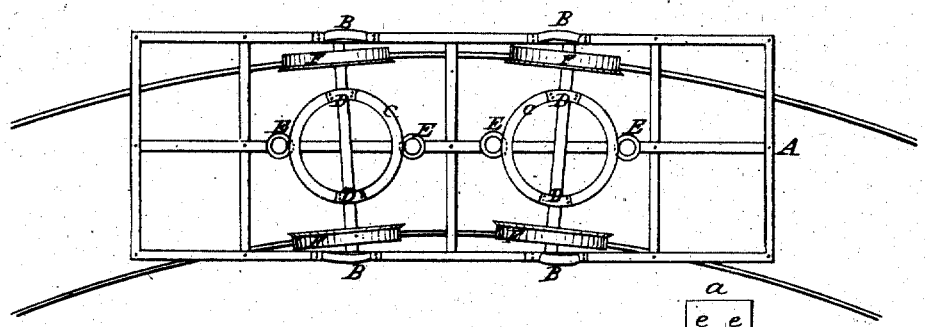
Figure 3:
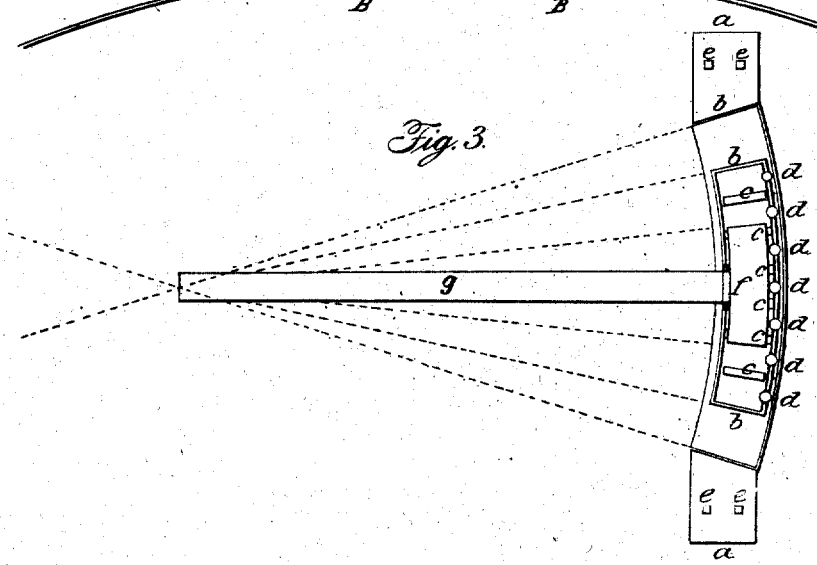

No Printed Specification Available

7375X

J. P. FAIRLAMB.

Car Truck.

Patented Jan. 19, 1833.

Jonas P. Fairlamb of Philadelphia Pennsylvania

Letters Patent.

The Schedule referred to in these Letters Patent and making part of the same containing a description in the words of the said Jonas P. Fairlamb himself of his improvement in constructing Rail Road Cars.

To all to whom these presents shall come. Be it known that I Jonas P. Fairlamb of the City of Philadelphia in the State of Pennsylvania have invented a new and useful improvement in Cars for running on Rail or other Roads, and that the following is a full and exact description of the construction and operation of the said Car or machine as invented or improved by me. The frame or what is generally called the wooden part of this Car is similar to those in common use with the exception of a piece of timber or other substance of sufficient strength extending lengthwise of the car at equal distance from each side and of convenient height from the axles to insert or attach the necessary vertical rollers hereafter ~~mentioned~~ I provide the following described boxes, plates and bearings for the journals of the axles to move in to wit. plates of iron or other strong substance of sufficient width, length, and thickness, with circular flanges on the one side or outer edge thereof extending downwards a sufficient distance to contain the necessary horizontal conical rollers and movable boxes, or bearings in which the journals of the axles move. The radii of the in and concave sides of these circular flanges being half the length of the axle or shaft on which the wheels are fastened. These plates I attach or fasten to the frame of the car in their proper places to suit their corresponding journals of the two axles by iron bolts ^in the following^ of sufficient strength I provide for each bearing two three or more conical rollers of sufficient diameter length and strength which I confine in a strong frame each to[?] form ing part of a cone the vertex of which is the middle distance between the ends of the axles and their plane is near horizontal as their cones will admit. I also provide vertical rollers two or more for each set of conical rollers confined in the inner outer part of the same frame, and of the same diameter as the largest diameter of the said conical rollers, the journals of all the rollers being so much less in diameter than their respective rollers as to admit their frame

[illegible]

to vibrate freely with the rollers without friction by coming in contact either
with the underside of the aforesaid horizontal plate or inside of the said [illegible] annular
flange thereof, against which plate and flange the periphery of the rollers
bear, their planes forming a horizontal circular groove or rabbet for each box,
in which groove I place a moveable box resting against the periphery of the
rollers in which box the journal of the axle turns, at or near the ends of the
aforesaid plates. I form vertical flanges to prevent the said Box from vibrating
further than necessary, and to enable me to enclose the whole box rollers and
journals, and thereby keep out the dust and to contain therein a sufficient
quantity of oil which I supply through an aperture in the upper plate.
I provide two horizontal circular plates or rings of less diameter than the dis
tance between the wheels on their corresponding axles. the centres of these two
circles or rings are the middle distance from the ends of the axles or shafts
These circles I confine to their proper place by boxes connecting them with
their respective axles and the axles passing through and revolving in those
boxes. To the first mentioned piece of timber or other material of sufficient
strength I attach two vertical friction Rollers for each of said circles to rest
against, and roll when acted on by the cone of the wheels and vibrating of
the axles. The middle distance between each end of the axle is common,
to the vertex of the conical rollers, and the cones formed by them at each end
of the axle and to the centres of the two horizontal circles in which the vertical
rollers are placed. The operation of this Car is as follows. the wheels being
conical with their vertexes opposite will always adjust the axles at right angles
with the rail way, crooked, or straight, while at the ~~same~~ time the car passes
over the same. They have no tendency to leave the track on a curve, and prevent
the flanges of the wheels from pressing against the inside of the rails and the
whole with the above arrangement and construction of boxes and horizontal
circles, conical and vertical rollers operates freely with an immense saving of
reaction on curves. To after cars of Locomotive Engines already made without
affecting the Engine I let the cranks axle remain permanent [illegible] used and leave
one wheel. I therefore claim the exclusive right to the invention of the con
struction of the above boxes rollers and circular plates or rings as applied by
me to cars travelling rail or other roads and all other parts of the above mentioned

1375X

99.

and therefore can not be certifyed to be known. In witness whereof I have hereunto set my hand this 29th day of December Anno Domini one thousand Eight Hundred and Sixty two

64.

Witnesses

J. Sheppard

John Aldison

J. D. Fairlamb

Pl.

(Dr in post folio)

938 1953